(12) United States Patent
Stewart (10) Patent No.: US 11,283,362 B2
(45) Date of Patent: Mar. 22, 2022

(54) SERIES AC VOLTAGE REGULATOR

(71) Applicant: Edge Electrons Limited, Hong Kong (HK)

(72) Inventor: Neal George Stewart, Makati (PH)

(73) Assignee: Edge Electrons Limited, Hong Kong (HK)

( * ) Notice: Subject to any disclaimer, the term of this patent is extended or adjusted under 35 U.S.C. 154(b) by 461 days.

(21) Appl. No.: 16/330,373

(22) PCT Filed: Sep. 1, 2017

(86) PCT No.: PCT/IB2017/055260
§ 371 (c)(1),
(2) Date: Mar. 5, 2019

(87) PCT Pub. No.: WO2018/047044
PCT Pub. Date: Mar. 15, 2018

(65) Prior Publication Data
US 2021/0313898 A1 Oct. 7, 2021

Related U.S. Application Data

(60) Provisional application No. 62/385,249, filed on Sep. 9, 2016.

(51) Int. Cl.
*H02M 5/275* (2006.01)
*H02M 5/293* (2006.01)
(Continued)

(52) U.S. Cl.
CPC .............. *H02M 5/293* (2013.01); *G05F 1/44* (2013.01); *H02M 5/16* (2013.01)

(58) Field of Classification Search
CPC ........ H02M 5/22; H02M 5/275; H02M 5/293; H02M 5/10; H02M 5/16; H02M 5/02; G05F 1/40; G05F 1/44
See application file for complete search history.

(56) References Cited

U.S. PATENT DOCUMENTS 5,545,971 A * 8/1996 Gomez ................ G05F 1/24
323/259
6,020,726 A * 2/2000 James ................ H02J 3/1814
323/239
(Continued)

FOREIGN PATENT DOCUMENTS

| CN | 105723603 A | 6/2016 |
| CN | 105874701 A | 8/2016 |
| EP | 2221705 A1 | 8/2010 |

OTHER PUBLICATIONS

International Search Report of corresponding PCT Patent Application No. PCT/IB2017/055260 dated Dec. 28, 2017.

*Primary Examiner* — Adolf D Berhane
(74) *Attorney, Agent, or Firm* — Idea Intellectual Limited; Margaret A. Burke; Sam T. Yip (57) ABSTRACT

A system for controlling and regulating the AC voltage level delivered to a load regardless of the varying input AC voltage comprises a high frequency AC series voltage regulator coupled with a low frequency operating mains transformer. In one embodiment, the LF operating mains transformer operates at electrical mains frequency, which is typically 50 Hz or 60 Hz. The magnetic core of the LF operating mains transformer may be made of industry standard low frequency core material selected from a material group including silicon steel and amorphous core such as 'Metglass'. The AC series voltage regulator is connected to the primary of the LF operating mains transformer, and the secondary of the LF operating mains transformer is connected in series between the mains input (which receives the unregulated input AC voltage to be regulated) and its output (which outputs the regulated AC voltage to the loads).

7 Claims, 4 Drawing Sheets

(51) Int. Cl.
*G05F 1/44* (2006.01)
*H02M 5/16* (2006.01)

(56) References Cited

U.S. PATENT DOCUMENTS

| | | | |
|---|---|---|---|
| 9,148,058 B2 * | 9/2015 | Stewart | H02M 5/293 |
| 9,819,279 B2 * | 11/2017 | Stewart | G05F 1/44 |
| 9,941,698 B2 * | 4/2018 | Stewart | H02J 3/1814 |
| 2015/0115913 A1 * | 4/2015 | Stewart | H02M 1/38 |
| | | | 323/271 |
| 2020/0059154 A1 * | 2/2020 | Zapata | H02M 5/293 |

* cited by examiner

SERIES AC VOLTAGE REGULATOR

CROSS-REFERENCE OF RELATED PATENTS AND PATENT APPLICATIONS

This application is the national phase entry of the International Application No. PCT/IB2017/055260, filed Sep. 1, 2017, which claims priority under the Paris Convention to the U.S. Provisional Patent Application No. 62/385,249, filed Sep. 9, 2016, the disclosures of which are incorporated herein by reference in their entirety.

FIELD OF THE INVENTION

The present invention generally relates to power electronics. Particularly, the present invention relates to methods and power electronics for regulating alternating current (AC) voltage, and more particularly regulating an output AC voltage to a desired level regardless of the variation in an input AC voltage.

BACKGROUND

AC voltage regulators are used to closely control and regulate the AC voltage level being delivered to a load connected to the output of the AC voltage regulator, regardless of the AC voltage variation at the input of the AC voltage regulator.

This has been traditionally done by various low-frequency (LF), typically at 50 or 60 Hz, or other frequencies, electrical mains magnetic structures. These structures are typically tapped at specific discrete transformer voltage taps in various transformers or transformer configurations. Nonetheless, all these structures rely on traditional AC switching devices such as relays or semiconductor devices such as silicon-controlled rectifiers (SCR)'s or gate turn off thyristor (GTO)'s connected as anti-parallel AC switches, TRIAC's, AC switches such as insulated-gate bipolar transistors (IGBT)'s, MOSFET transistors, and SCR's configured as AC switches, e.g. connected between rectifiers. These AC switches are selected and activated by the electronic control circuit to automatically switch the selected magnetic transformer structure tap, in turn adjusting the transformer or transformer configuration turns ratio to control the AC output voltage as close as possible to the desired level.

Another traditional method to regulate an output AC voltage is to use an electro-mechanically-adjusted auto-transformer that is driven by electrical mechanical means, such as a controlled electrical motor. The electronic control in this case senses the input voltage and then drives the electro-mechanical means to move the output contact to adjust the turns of the auto-transformer, in turn sets the correct turns ratio to fix the output AC voltage to the desired level. These electro-mechanically-adjusted auto-transformer devices are also LF magnetic structures, typically at 50 Hz or 60 Hz, or other frequencies, and generally use carbon brushes to make the moving electrical contact to the auto-transformer windings. These brushes, however, undergo mechanical wear as such they need frequent maintenance and replacement.

SUMMARY

A system for controlling and regulating the AC voltage level delivered to a load regardless of the varying input AC voltage comprises at least one of the AC series voltage regulators disclosed and claimed in PCT Application No. PCT/CN2014/093475 and PCT Application No. PCT/CN2014/089721, coupled with a LF operating mains transformer. In one embodiment, the LF operating mains transformer operates at electrical mains frequency, which is typically 50 Hz or 60 Hz. The magnetic core of the LF operating mains transformer may be made of industry standard low frequency core material selected from a material group including silicon steel and amorphous core such as 'Metglass'. In an embodiment, the AC series voltage regulator is connected to the primary of the LF operating mains transformer, and the secondary of the LF operating mains transformer is connected in series between the mains input (which receives the unregulated input AC voltage to be regulated) and its output (which outputs the regulated AC voltage to the loads).

BRIEF DESCRIPTION OF THE DRAWINGS

Embodiments of the invention are described in more detail hereinafter with reference to the drawings, in which.

DETAILED DESCRIPTION

In the following description, methods, systems, and apparatuses for regulating an output AC voltage to a desired level regardless of the variation in an input AC voltage and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance to an embodiment of the present invention, provided is a voltage regulating system for regulating the AC voltage level delivered to a load regardless of the fluctuating input AC voltage. The voltage regulating system comprises at least one of the AC series voltage regulators disclosed and claimed in PCT Application No. PCT/CN2014/093475 and PCT Application No. PCT/CN2014/089721, coupled with a LF transformer. In one embodiment, the LF transformer operates at the electrical mains frequency, which is typically 50 Hz or 60 Hz. The magnetic core of the LF transformer may be made of industry standard low frequency core material selected from a material group including silicon steel and amorphous core such as 'Metglass'. In an embodiment, the AC series voltage regulator is connected to the primary of the LF transformer, and the secondary of the LF transformer is connected in series between the mains input (which receives the unregulated input AC voltage to be regulated) and its output (which outputs the regulated AC voltage to the loads).

Figure 1:
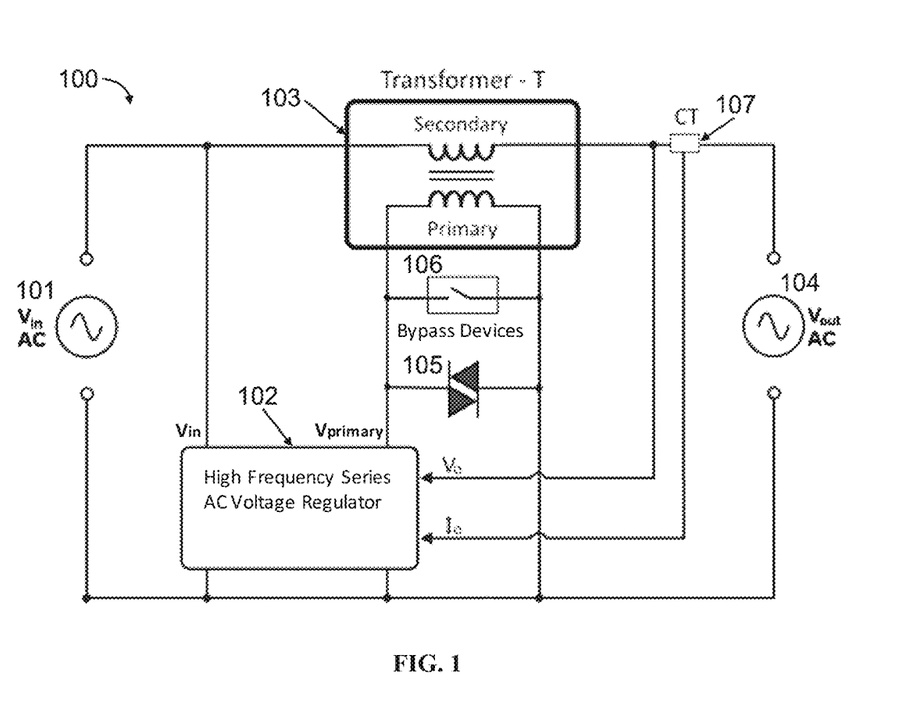
FIG. 1 depicts a system diagram of a voltage regulating system comprising a HF AC series voltage regulator and a LF transformer in accordance to an embodiment of the present invention.

Referring to FIG. 1. A HF series AC voltage regulator 102 is connected to an unregulated input AC voltage ($V_{in}$) source 101 on the mains and the primary of a transformer 103 such that the input of the HF series AC voltage regulator 102 is connected in parallel (across the mains hot and neutral lines) with the unregulated input AC voltage ($V_{in}$) source 101. The output of the HF series AC voltage regulator 102 is connected in parallel (across the mains hot and neutral lines) with the primary of the transformer 103. As the unregulated input AC voltage ($V_{in}$) level fluctuates, the control electronics within the HF series AC voltage regulator 102 senses the input AC voltage ($V_{in}$) level and the output AC voltage ($V_{out}$) level and output current ($I_{out}$) level, controls and sets up an in-phase positive or an in-phase negative differential AC voltage ($V_{primary}$) output by the HF series AC voltage regulator 101 to the primary of the transformer 103. The output AC voltage ($V_{out}$) is taken on the hot line at the output of the voltage regulating system 100, and the output current ($I_{out}$) is taken from the output of the current transformer 107 on the hot line at the output of the voltage regulating system 100. The secondary of the transformer 103 is connected in series on the mains hot line between the unregulated input AC voltage ($V_{in}$) source and the regulated AC voltage ($V_{out}$) output 104 of the voltage regulating system 100.

With the in-phase positive or an in-phase negative differential AC voltage ($V_{primary}$) output by the HF series AC voltage regulator 102 and feeding the primary of the transformer 103, it regulates the varying input AC voltage ($V_{in}$) by voltage level additions or subtractions produced across the secondary of the transformer 103 and consequently producing the regulated output AC voltage ($V_{out}$) at a desired voltage level.

The voltage regulating system 100 further comprises a semiconductor relay device 105 and optionally an electromechanical bypass device 106, both connected across in parallel with the primary of the transformer 103. The semiconductor relay device 105 and the electromechanical bypass device 106 protect the voltage regulating system 100 from overvoltage and/or overcurrent i.e. in the event of loads short circuit, faulty power electronics, or system overheating. The semiconductor relay device 105 may comprise one or more of TRIACS, SCRs, and similarly functional semiconductor devices. The electromechanical bypass device 106 can be one or more of electromechanical relays and contactors. Both the semiconductor relay device 105 and the electromechanical bypass device 106 are triggered and controlled by the control electronics of the HF series AC voltage regulator 102.

In an alternative embodiment, both the semiconductor relay device 104 and the optional electromechanical bypass device 105 are connected across in parallel with the secondary, instead of the primary, of the transformer 103. However, connection with the primary is preferred as the bypass current is lower in the primary circuit than in the secondary circuit of the transformer 103.

An ordinarily skilled person in the art should appreciate that aforesaid system design can utilize LF transformers, various forms of single or polyphaser isolated or non-isolated, or auto-transformer magnetic structures, typically for 50 Hz or 60 Hz mains frequency, coupled with one of the HF series AC voltage regulators disclosed and claimed in PCT Application No. PCT/CN2014/093475 and PCT Application No. PCT/CN2014/089721 to achieve the regulation of AC voltage. In this case, the HF series AC voltage regulator is modified to have its control electronics taking the output AC voltage ($V_{out}$) and output current ($I_{out}$) of the voltage regulating system instead of the voltage regulator.

In one embodiment, the secondary of a transformer is connected in series between the unregulated input AC voltage ($V_{in}$) source and the regulated AC voltage ($V_{out}$) output. The primary of the transformer is connected in parallel to a HF pulse width modulation (PWM) voltage generator, such as one of the HF series AC voltage regulators disclosed and claimed in PCT Application No. PCT/CN2014/093475 and PCT Application No. PCT/CN2014/089721. The HF PWM voltage is applied to the primary of the transformer, which in turn generates the in-phase or out-of-phase voltage corrections across the secondary of the transform to produce the desired regulated AC voltage (Vow) from the unregulated input AC voltage ($V_{in}$).

The advantages of employing one of the HF series AC voltage regulators disclosed and claimed in PCT Application No. PCT/CN2014/093475 and PCT Application No. PCT/CN2014/089721 coupled with a LF transformer or magnetic structure is that only a fraction of the total power being regulated is used in correcting the mains voltage variation. It is because the power electronics of the HF series AC voltage regulator are connected to the primary of the LF transformer or magnetic structure instead of directly to the mains, and only require to generate the differential AC voltage ($V_{primary}$) for the voltage corrections needed across the secondary of the LF transformer or magnetic structure. For example, in the case where a voltage correction of +/−10% is needed, the HF series AC voltage regulator only needs to process approximately 20% of the total power.

Furthermore, in the event of abnormal current load demand surges, for example such as motor starts, or even a short circuit at the loads, since the power electronics of the HF series AC voltage regulators are connected to the primary of the LF transformer or magnetic structure, the power electronics are largely protected as the primary current is much lower than the load current or the surge current through the secondary winding of the LF transformer or magnetic structure.

Although the foregoing description and the drawings describe only a single phase AC system, any ordinarily skilled person in the art can apply the inventive principles described herein to any poly-phase AC systems, such as three-phase electrical systems, without departing from the scope and spirit of the invention.

The embodiments disclosed herein may be implemented using general purpose or specialized computing devices, computer processors, microcontrollers, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The disclosures of PCT Application No. PCT/CN2014/093475 and PCT Application No. PCT/CN2014/089721 are incorporated herein by reference in their entirety. The HF series AC voltage regulators disclosed and claimed in PCT Application No. PCT/CN2014/093475 and PCT Application No. PCT/CN2014/089721 are also described below.

HF Series AC Voltage Regulator Disclosed and Claimed in PCT/CN2014/093475

Figure 2:
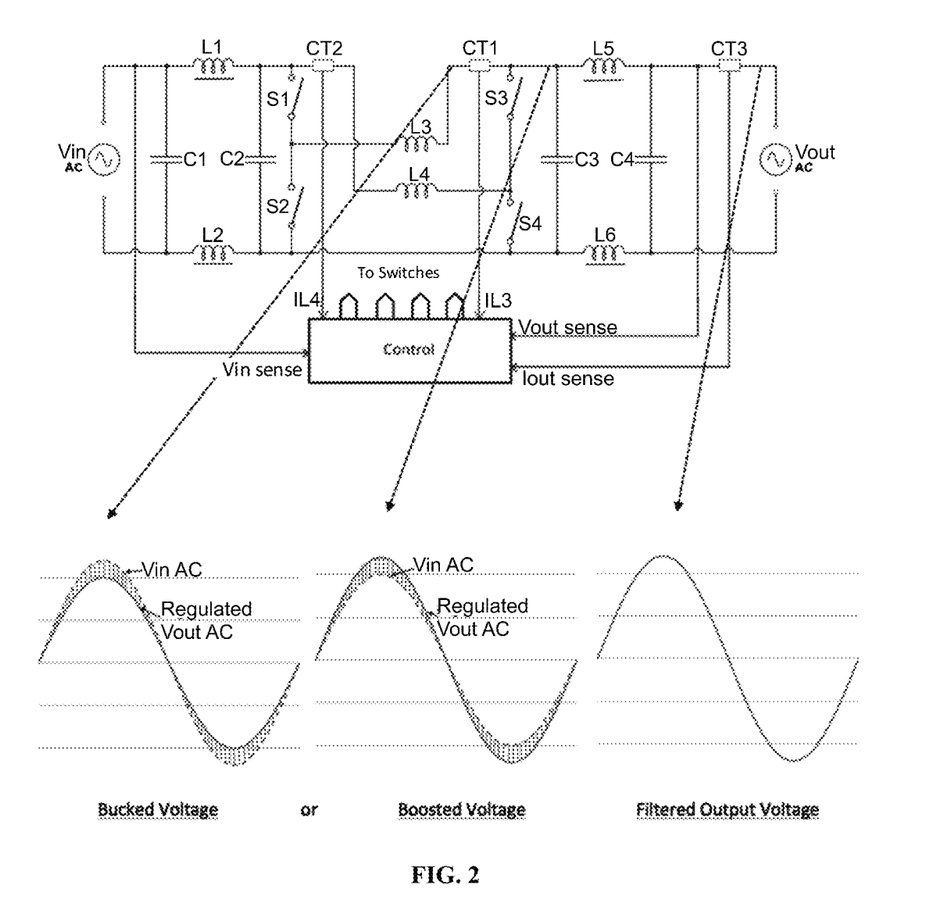
FIG. 2 depicts a circuit diagram of an embodiment of the HF AC series voltage regulator disclosed and claimed in PCT/CN2014/093475.

FIG. 2 shows the basic operating principles of a complete HF series AC voltage regulator disclosed and claimed in PCT/CN2014/093475 that can buck or boost the AC input voltage at each HF point. For example, if the operating frequency of the AC voltage regulator is selected to be 25 KHz, then the input voltage is sensed by the electronic analogue or digital control and compared to an internal reference, and then the AC bidirectional switches are driven under control to buck (reduce) or boost (increase) the AC input voltage. The voltage is adjusted at each 40 microsecond point through each LF mains voltage cycle, typically at 50 Hz or 60 Hz, or other frequencies, under analogue or digital electronic control with reference to an internal voltage level is able to regulate the AC output voltage to the desired set level. This is shown in FIG. 2 with the waveforms showing the HF PWM bucking or boosting the input AC voltage, and the output AC voltage being filtered by the filter components to eliminate the HF switching pulses.

Still referring to FIG. 2. This HF buck-boost AC voltage regulator utilizes HF power inductors (e.g. 1 KHz-1,000 KHz) L3 and L4, in combination with AC bidirectional semiconductor switches Q1, Q2, Q3, and Q4, that are driven by an electronic control circuit to create a unique topology that can increase or decrease the input AC voltage to regulate the AC output voltage to a set desired level. So at each HF PWM interval (for example 40 microsecond PWM intervals at 25 KHz) the input voltage in bucked (reduced) or a boosted (increased) under HF switch control that generates the correct PWM drive signal to the AC switches at each HF point on the mains low frequency, typically at 50 Hz or 60 Hz, or other frequencies, to buck or boost and correct the input AC voltage level, against a desired set output AC voltage in the control electronics. Also, this HF series buck-boost AC voltage regulator only has to process the differential power across the buck and boost inductors, L3 and L4, to regulate the input to out AC voltage, so this is much less power than the total output power because of the configuration. The buck and boost inductance only has to handle the power required to adjust the differential input AC voltages to regulate the output AC voltage to the desired set level.

Figure 3:
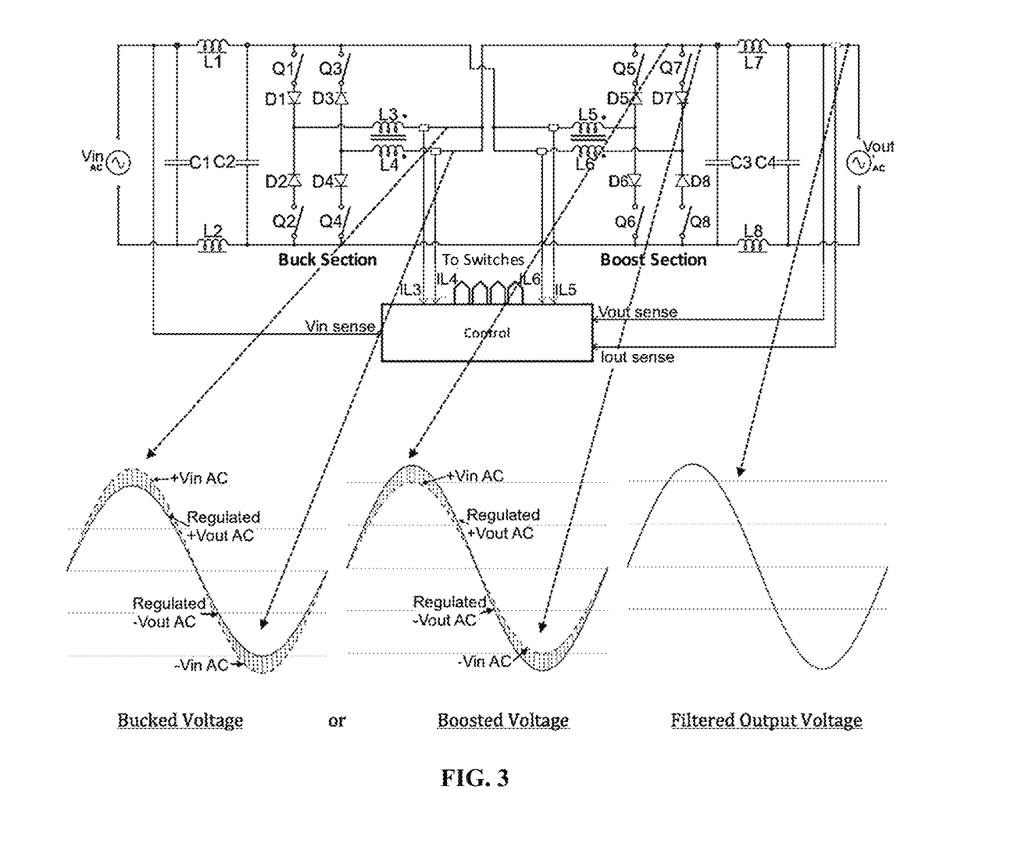
FIG. 3 depicts a circuit diagram of another embodiment of the HF AC series voltage regulator disclosed and claimed in PCT/CN2014/093475.

Referring to FIG. 3. Shown in FIG. 3 is an improved voltage regulator topology over the topology shown in FIG. 2. Instead of using unipolar switches connected as AC switches, the AC inductor current path in the buck and boost sections is split into two unipolar paths. In the buck section, the two unipolar paths are represented by two diode connected as half-bridge branches, each responsible for the conduction of unipolar current. In the topology shown in FIG. 3, Q1/D1, Q2/D2, and L3 conducts current from left to right; and at the same time, Q3/D3, Q4/D4, and L4 conducts current from right to left. Inductor L3 and L4 are coupled inductors having identical number of turns for symmetry reason. The total output current, having the waveform of a typical buck converter is the sum of currents of L3 and L4 branches. The voltage regulation, again take the buck section as example, is controlled by conventional PWM method. The AC output voltage is linearly proportional to the duty cycle of the forward switches Q1/D1 and Q3/D3. The two distinct switching states are the same as those of a conventional buck converter: (1) Forward state: Q1/D1 and Q3/D3 switch on, Q2/D2 and Q4/D4 switch off; (2) Freewheel state: Q1/D1 and Q3/D3 switch off, Q2/D2 and Q4/D4 switch on. A small turn-on timing overlay is provided during switching state transition from Forward to Freewheel and Freewheel to Forward to provide current continuity for the two inductor paths L3 and L4.

The AC output current is split into two unipolar paths as determined by the topology switch and diode directions. There is a small circulation current build-up in L3 and L4 paths, which is a small fraction of the full-load current and does not increase as the load current increases. The instantaneous ripple current direction reversal near output current zero-crossing is the sum of the circulation current ripple which is automatically handled by the topology. The amount of circulation current at specific operating voltage is a function of the PWM overlapping period and leakage inductance of the coupled inductors L3 and L4.

The AC current output current can be in any phase relationship relative to the input and output voltage. For this reason this AC regulator topology is capable of operating in all four possible quadrants of the AC voltage and current cycle. The topology can handle any power factor and bi-directional power flow without the need of an intermediate DC link.

Due to the inherent unipolar nature of individual switching branches. The diode series connected half-bridge branches are shoot-through proof. This topology does not require accurate voltage and current polarity sensing to operate, the simple PWM relationship makes this topology very robust to power line voltage and current perturbation. The use of current sensing points along L3, L4, L5, and L6 are for protection and housekeeping purpose.

The improved AC buck-boost voltage regulator employs lower loss unipolar switches in series with one rectifier. The power inductors, however, need to be treated separately. So in reference to FIG. 3, by making the unipolar semiconductor switching devices: Q1, Q2, Q3, Q4, Q5, Q6, Q7, and Q8 with series diodes: D1, D2, D3, D4, D5, D6, D7, and D8 respectively, the power inductors L3 and L4 in FIG. 2 can now be separated into power inductors L3 and L4 in the buck section, and L5 and L6 in the boost section as shown in FIG. 3.

For the input AC voltage, if the AC voltage input level is above the desired set AC reference level in the electronic control circuitry, then the buck section will reduce the voltage at each 40 microsecond point (25 KHz frequency as an example) on the LF frequency mains AC input voltage, typically at 50 hz or 60 Hz, or other frequencies, with Q1 and D1, and Q2 and D2 with HF power inductor L3 processing the positive AC half cycle; and Q3 and D3, and Q4 and D4 with power inductor L4 processing the negative AC half cycle.

Similarly, if the AC voltage input level is below the desired set AC reference level in the electronic control circuitry, then the boost section will increase the voltage at each 40 microsecond point (25 KHz frequency as an example) on the LF frequency mains AC input voltage, typically at 50 Hz or 60 Hz, or other frequencies, with Q5 and D5, and Q6 and D6 with HF power inductor L5 processing the positive AC half cycle, and Q7 and D7; and Q8 and D8 with inductor L6 processing the negative AC half cycle.

With the positive and negative half cycles processed separately in the buck or boost input AC voltage processing, the positive and negative half cycles are processed independently. Hence, there is also no destructive shoot-through by any of the unipolar low loss semiconductor switches, as each semiconductor switch is now a single unipolar semiconductor device in series with only one rectifier. Furthermore, this unipolar switch topology is able to accept a wide coupling coefficient variation of the coupled inductor pairs L3/L4 and L5/L6, ranging from close to unity to zero (uncoupled). With this flexibility, one can either wound two windings on the same inductor core to save space or separate the coupled inductor pairs into two individual inductors to minimize circulating current.

In the AC switch topology shown in FIG. 2, these bipolar AC semiconductor switches are typically created from a combination of unipolar semiconductor devices such as using an SCR, GTO, IGBT, or MOSFET inserted into a full rectifier bridge that adds additional rectifier power loss; or from using high loss AC bipolar devices such as TRIACS, back-to-back SCR's, or GTO's.

The present invention, on the other hand, has a number of advantages: a very robust buck-boost HF AC voltage regulator as there is no possibility of shoot-through, minimum and non-critical switching overlap timing for reducing peak currents, and the use of low loss unipolar semiconductor switches in series with one rectifier that reduces losses compared to a traditional single AC semiconductor switch. The analogue control circuitry, or preferably digital electronic control circuitry using DSP or microprocessor, is configured to handle all of the voltage sensing and control of the semiconductor switch timing. Since the destructive possibility of the semiconductor devices shoot-though is eliminated, the control circuitry is easier to implement with non-critical reference switch overlap timing. Therefore, the present invention presents a very robust improved HF AC voltage regulator.

The circuitries described in this document are simplified for demonstrating the basic principles of the present invention which utilizes unipolar semiconductor switches in series with one rectifier, and that the positive and negative cycles of the input AC voltage are processed separately with its own power inductor, either in a buck configuration for voltage decreasing, or boost configuration for a AC voltage increase. It should be obvious to any ordinarily skilled person in the art to be able to substitute the unipolar semiconductor switches in series with one rectifier, as shown in FIG. 3, with IGBT, FET, SCR, GTO's and any of such devices in any configuration to achieve the same unipolar switching performance Some configurations of the unipolar switching devices can be changed to facilitate the drive connections from the electronic control circuitry.

For example in FIG. 3, in reference to the unipolar semiconductor switching devices Q1 and Q2 each coupled with series rectifiers D1 and D2, the two unipolar switching semiconductor devices Q1 and Q2 can be connected to a common point at power inductor L3, with rectifiers D1 and D2 connected to the line, and ground, respectively. This or other similar configurations can be applied to each of the switching elements, but basically achieving the same effect, which is that of a unipolar switching semiconductor device in series with a rectifier. Additional rectifiers in series can be used, though the losses can be higher. Also, the buck AC voltage regulator section as shown in FIG. 3 can be used as a standalone series AC buck voltage regulator; and the boost AC voltage regulator as shown in FIG. 3 can be used as a standalone series AC boost voltage regulator. Any ordinarily skilled person in the art can apply the inventive principles described herein to any poly-phase AC systems, such as three-phase electrical systems, without departing from the scope and spirit of the invention.

HF Series AC Voltage Regulator Disclosed and Claimed in PCT/CN2014/089721

Figure 4:
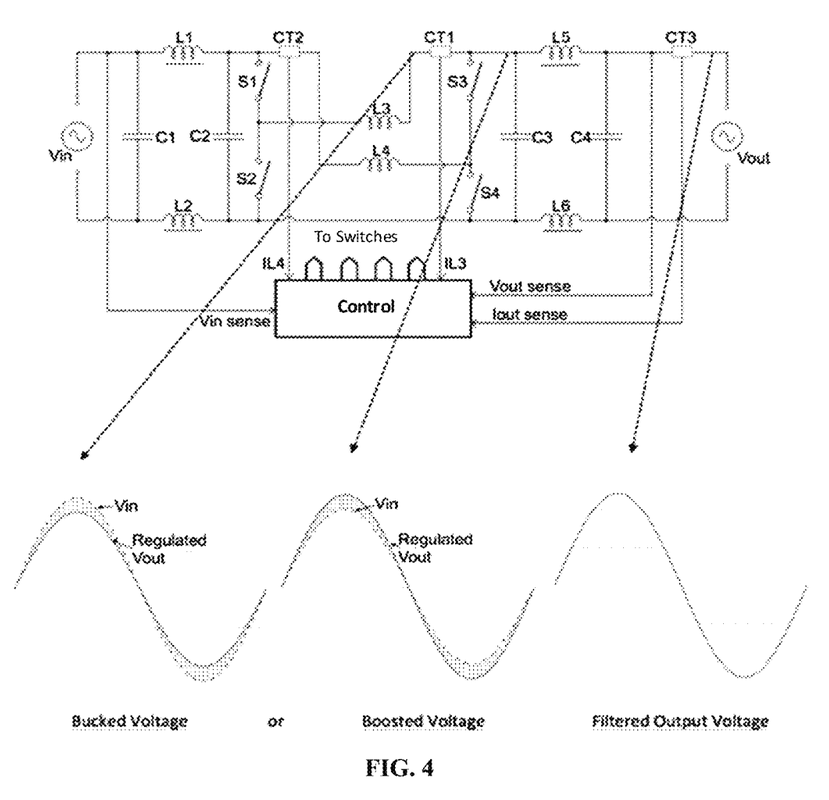
FIG. 4 depicts a circuit diagram of an embodiment of the HF AC series voltage regulator disclosed and claimed in PCT/CN2014/089721.

FIG. 4 shows the basic operating principles of a complete HF series AC voltage regulator disclosed and claimed in PCT/CN2014/089721 that can buck or boost the AC input voltage at each HF point. For example, if the operating frequency of the HF series AC voltage regulator is configured to be 25 kHz, then the input voltage is sensed by the electronic analogue or mix of digital and analogue circuitry and compared to a voltage reference, and then the AC bidirectional semiconductor switches S1, S2, S3, and S4 in combination with the power inductors L3 and L4 are driven under PWM control to buck (reduce) or boost (increase) the AC input voltage at the AVR HF AC series voltage regulator output. The voltage is adjusted at each 40 microsecond interval point through each LF mains voltage cycle, typically, but not limited to, 50 Hz or 60 Hz. Therefore, under an analogue or digital electronic PWM control with reference to a fixed reference voltage level, the full HF AC series voltage regulator is able to fully regulate the AC output voltage to the desired set level.

FIG. 4 also shows the waveforms of the HF PWM bucking or boosting the input AC voltage at the HF AC series voltage regulator output, and the input filter components C1, C2, L1, and L2 in combination are used to eliminate the HF switching energy from passing back into the input AC source; and the output filter components C3, C4, L5, and L6 in combination are used to eliminate the output HF PWM switching pulses and to average the HF voltage PWM ripple to an average DC level, creating a smooth regulated AC output voltage.

The circuitries and description thereof disclosed herein are simplified for clarity and various other circuit configurations and devices can be used in applying the principles of the present invention. For instance, the bidirectional AC switches are semiconductor devices and can comprise of various circuit configurations, but these switches are still acting as AC bidirectional semiconductor switches as used commonly in the industry. Such Bidirectional AC semiconductor switches, for example, but not limited to, can be a rectifier bridge comprising of four rectifiers with a unipolar semiconductor device configuration inserted in the bridge such as SCR, GTO, IGBT, MOSFET, or any other semiconductor device used for the same effect with PWM drive control that can create a controlled bidirectional AC semiconductor switch device. Also, other semiconductor AC switch configurations and devices used in the industry with or without rectifiers such as back-to-back or anti-parallel-SCR's, GTO, IGBT, RB-IGBT, MOSFET, any other back-to-back or anti-parallel bidirectional AC semiconductor devices or configurations, or any other similar new semiconductor devices in the future, such as, but not limited to, GaN, SiC are some of the alternative embodiments of the present invention.

Although only single phase electrical systems are described herein, the principles of the present invention can be applied to other AC frequency and poly-phase AC systems, for example, common 3-phase electrical systems, by utilizing and interconnecting a number of the HF AC series buck topology, HF series boost topology, or combined HF series buck-boost topology for full HF AC automatic voltage control sections or units to create poly-phase voltage regulators. Since these HF series voltage sections can be independently controlled, they can also be designed for voltage balancing configurations to rebalance out of balance poly-phase voltages.

The HF buck-boost AC series voltage regulator shown in FIG. 4 utilizes the HF (e.g. 1 KHz-1,000 KHz) power inductor L3 in combination with the AC bidirectional semiconductor switches S1 and S2 to bucks the AC input voltage, and HF power inductor L4 in combination with the AC bidirectional semiconductor switches S3 and S4 to boosts the AC input voltage. The AC bidirectional semiconductor switches, S1, S2, S3, and S4, are driven individually by PWM outputs from the electronic control circuit to create an automatic voltage control topology that can decrease (buck) or increase (boost) the input AC voltage to regulate the AC output voltage to a set desired level. This design is power-flow bidirectional, direct single stage, and has no internal DC link capacitor, which is typically an unreliable electrolytic capacitor.

In other embodiments, the buck topology and the boost topology can operate separately. Along with the combined HF buck-boost AC series voltage regulator topology shown in FIG. 4, anyone of these topologies needs only to process a portion of the total output power depending on the level of AC input voltage range and variation.

At each HF PWM interval, for example 40 microsecond PWM intervals at 25 kHz, the input voltage in bucked (reduced) or boosted (increased) under HF switch PWM control that generates the correct PWM drive signal to the bidirectional AC semiconductor switches at each HF point on the mains low frequency, typically 50 or 60 Hz, to buck or boost and correct the output AC voltage level to a desired set output AC voltage reference fed to the control electronics.

Other embodiments include various filter configurations that can create the desired effect as described above, with an input filter configuration to eliminate the high frequency switching pulses from entering the input AC mains source, and an output filter configuration eliminating the high frequency switching pulses from the output AC voltage. Still other embodiments include an AC output voltage feedback loop and control electronics to regulate the output voltage to meet the AC output voltage specification of a root-mean-square (RMS), the preferred embodiment, an average voltage, or peak voltage levels of the AC output voltage.

Also, the HF AC series buck-boost AC voltage regulator, and the independent buck or boost sections if used separately, only have to process the differential power across the buck and boost inductors, L3 and L4 respectively, to regulate the varying input AC voltage to a fixed and regulated output AC voltage; thus, this is much less power than the total output power because of the configuration. The buck and boost inductors, L3 and L4 respectively only have to handle the proportion of the total output power required to adjust the differential input AC voltages to regulate the output AC voltage to the desired set level.

What is claimed is:

1. An alternating current (AC) series voltage regulating system for regulating an AC voltage on a mains, comprising:
    a high frequency (HF) AC series voltage regulator;
    a low frequency (LF) transformer or magnetic structure having a primary and a secondary configured for bidirectional power flow; and
    a semiconductor relay device and an electromechanical bypass device, both connected across in parallel with the primary of the transformer or magnetic structure;
    wherein the HF series AC voltage regulator is connected to an unregulated input AC voltage source on the mains and the primary of the transformer or magnetic structure such that the HF series AC voltage regulator input is connected in parallel, across the mains hot and neutral lines, with the unregulated input AC voltage source;
    wherein the HF series AC voltage regulator output is connected in parallel, across the mains hot and neutral lines, with the primary of the transformer or magnetic structure;
    wherein the secondary of the transformer or magnetic structure is connected in series on the mains hot line between the unregulated input AC voltage source and the voltage regulating system output;
    wherein the HF series AC voltage regulator comprises control electronics;
    wherein the control electronics are configured to:
        receive the unregulated input AC voltage level, the AC series voltage regulating system output AC voltage level, and the AC series voltage regulating system output current level; and
        causes the HF series AC voltage regulator to generate a positive or negative differential AC voltage output to the primary of the transformer or magnetic structure, and in turn regulate the AC voltage on the mains by voltage level additions or subtractions produced across the secondary of the transformer or magnetic structure; and
    wherein the semiconductor relay device and the electromechanical bypass device are triggered and controlled by the control electronics of the HF series AC voltage regulator to bypass current to the primary of the transformer or magnetic structure for protection against overvoltage and overcurrent.

2. The AC series voltage regulating system of claim 1, wherein the HF AC series voltage regulator comprising:
    a HF AC series voltage buck power regulator topology for bucking an AC input voltage of an AC input power source, comprising:
        a first unipolar paths, comprising:
            a first half-bridge, comprising a first and a second rectifiers connected in series with a first and a second independently controllable unipolar switches respectively, and
            a first power inductor;
        a second unipolar paths, comprising:
            a second half-bridge, comprising a third and a forth rectifiers connected in series with a third and a forth independently controllable unipolar switches respectively, and
            a second power inductor; and
    a HF AC series voltage boost power regulator topology for boosting the AC input voltage, comprising:
        a third unipolar paths, comprising:
            a third half-bridge, comprising a fifth and a sixth rectifiers connected in series with a fifth and a sixth independently controllable unipolar switches respectively, and
            a third power inductor;
        a forth unipolar paths, comprising:
            a forth half-bridge, comprising a seventh and a eighth rectifiers connected in series with a seventh and a eighth independently controllable unipolar switches respectively, and a forth power inductor; and a control circuitry for receiving the AC input voltage, an AC reference voltage, and the AC output voltage, and generating switch driving signals for the unipolar switches;

wherein positive and negative half cycles of AC input voltage being processed separately and independently in either the AC HF series voltage boost power regulator topology or the AC HF series voltage buck power regulator topology at any one time eliminating any power "shoot-through".

3. The AC series voltage regulating system of claim 2, wherein either the HF AC series voltage boost power regulator topology or the HF AC series voltage bucking power regulator topology being inactivated.

4. The AC series voltage regulating system of claim 1, wherein the HF AC series voltage regulator comprising:

a HF AC series voltage buck power regulator topology for bucking an AC input voltage of an AC input power source, comprising:

a first unipolar paths, comprising:
a first half-bridge, comprising a first and a second unipolar switching devices, and
a first power inductor;

a second unipolar paths, comprising:
a second half-bridge, comprising a third and a forth unipolar switching devices, and
a second power inductor; and a HF AC series voltage boost power regulator topology for boosting the AC input voltage, comprising:

a third unipolar paths, comprising:
a third half-bridge, comprising a fifth and a sixth unipolar switching devices, and
a third power inductor;

a forth unipolar paths, comprising:
a forth half-bridge, comprising a seventh and a eighth unipolar switching devices, and
a forth power inductor; and a control circuitry for receiving the AC input voltage, an AC reference voltage, and the AC output voltage, and generating switch driving signals for the unipolar switching devices;

wherein positive and negative half cycles of AC input voltage being processed separately and independently in either the HF AC series voltage boost power regulator topology or the HF AC series voltage buck power regulator topology at any one time eliminating any power "shoot-through".

5. The AC series voltage regulating system of claim 4, wherein either the HF AC series voltage boost power regulator topology or the HF AC series voltage bucking power regulator topology being inactivated.

6. The AC series voltage regulating system of claim 1, wherein the HF AC series voltage regulator comprising:

a HF AC series voltage buck power regulator topology for bucking an AC input voltage of an AC input power source, comprising:

a first and a second independently controllable AC bidirectional switches, a first power inductor, and a first current transformer for generating a first power inductor current direction data signal indicating the first power inductor current direction;

a HF AC series voltage boost power regulator topology for boosting the AC input voltage, comprising:

a third and a forth independently controllable AC bidirectional switches, a second power inductor, and a second current transformer for generating a second power inductor current direction data signal indicating the second power inductor current direction; and a control circuitry for receiving the AC input voltage, an AC reference voltage, the AC output voltage, the first power inductor current direction data signal, and the second power inductor current direction data signal, and generating switch driving signals for the AC bidirectional switches.

7. The AC series voltage regulating system of claim 6, wherein either the HF AC series voltage boost power regulator topology or the HF AC series voltage bucking power regulator topology being inactivated.

\* \* \* \* \*